(12) United States Patent
Kato et al.

(10) Patent No.: US 10,782,025 B2
(45) Date of Patent: Sep. 22, 2020

(54) COMBUSTOR PIPE, COMBUSTOR, AND GAS TURBINE

(71) Applicant: Mitsubishi Hitachi Power Systems, Ltd., Kanagawa (JP)

(72) Inventors: Shin Kato, Kanagawa (JP); Taiki Kinoshita, Kanagawa (JP); Shingo Sato, Kanagawa (JP)

(73) Assignee: MITSUBISHI HITACHI POWER SYSTEMS, LTD., Kanagawa (JP)

( * ) Notice: Subject to any disclaimer, the term of this patent is extended or adjusted under 35 U.S.C. 154(b) by 136 days.

(21) Appl. No.: 15/758,480

(22) PCT Filed: Sep. 9, 2016

(86) PCT No.: PCT/JP2016/076625
§ 371 (c)(1),
(2) Date: Mar. 8, 2018

(87) PCT Pub. No.: WO2017/047516
PCT Pub. Date: Mar. 23, 2017

(65) Prior Publication Data
US 2018/0259185 A1      Sep. 13, 2018

(30) Foreign Application Priority Data

Sep. 15, 2015   (JP) ................. 2015-181927

(51) Int. Cl.
*F23R 3/06* (2006.01)
*F23R 3/42* (2006.01)
(Continued)

(52) U.S. Cl.
CPC .............. *F23R 3/06* (2013.01); *F01D 9/023* (2013.01); *F02C 7/18* (2013.01); *F23R 3/002* (2013.01);
(Continued)

(58) Field of Classification Search
CPC .... F02C 7/16; F02C 7/18; F01D 9/023; F23R 3/002; F23R 3/06; F23R 3/02; F23R 3/04; F23R 3/42
See application file for complete search history.

(56) References Cited

U.S. PATENT DOCUMENTS 6,341,485 B1   1/2002 Liebe
8,769,957 B2   7/2014 Hada et al.
(Continued)

FOREIGN PATENT DOCUMENTS

CN   102971510   3/2013
CN   104566381   4/2015
(Continued)

OTHER PUBLICATIONS

Notification of Reasons for Refusal dated Dec. 28, 2018 in Japanese Application No. 2017-539874, with English translation.
(Continued)

*Primary Examiner* — Craig Kim
(74) *Attorney, Agent, or Firm* — Wenderoth, Lind & Ponack, L.L.P.

(57) ABSTRACT

A combustor pipe is linked to a vane shroud in which a vane is provided, and includes an inlet, an outlet, an inner pipe of which an inner space is a flow path for passing a combustion gas, a first cooling flow path through which a cooling medium passes being formed inside a wall that forms the flow path; and an outer pipe on an outer circumference of the inner pipe and secured to the inner pipe. A second cooling flow path through which a cooling medium passes and which is connected to the first cooling flow path near the outlet of the combustor pipe is formed between an outer circumferential surface of the inner pipe and an inner circumferential surface of the outer pipe, and a cooling
(Continued)

promoting structure is formed on the outer pipe, inside the second cooling flow path near the first cooling flow path.

11 Claims, 15 Drawing Sheets

(51) Int. Cl.
 *F01D 9/02* (2006.01)
 *F23R 3/00* (2006.01)
 *F02C 7/18* (2006.01)
(52) U.S. Cl.
 CPC ............ *F23R 3/42* (2013.01); *F05D 2220/32* (2013.01); *F05D 2240/35* (2013.01); *F05D 2260/20* (2013.01); *F05D 2260/2212* (2013.01); *F05D 2260/2214* (2013.01); *F05D 2260/22141* (2013.01); *F05D 2260/2322* (2013.01); *F23R 2900/03043* (2013.01); *F23R 2900/03045* (2013.01)

(56) References Cited

U.S. PATENT DOCUMENTS

| 9,255,484 | B2* | 2/2016 | Cihlar .................... F01D 25/12 |
| 9,512,781 | B2 | 12/2016 | Mizukami et al. |
| 9,909,432 | B2* | 3/2018 | Kottilingam ............ F01D 25/12 |
| 9,915,428 | B2 | 3/2018 | Kishida et al. |
| 2013/0074502 | A1 | 3/2013 | Hada et al. |
| 2015/0107262 | A1 | 4/2015 | Maurer |
| 2016/0053998 | A1 | 2/2016 | Kishida et al. |

FOREIGN PATENT DOCUMENTS

| EP | 2623744 A1 * | 8/2013 |
| JP | 59-110336 | 7/1984 |
| JP | 10-82527 | 3/1998 |
| JP | 2001-524643 | 12/2001 |
| JP | 2003-286863 | 10/2003 |
| JP | 2006-105076 | 4/2006 |
| JP | 2008-274774 | 11/2008 |
| JP | 2010-90866 | 4/2010 |
| JP | 2012-77660 | 4/2012 |
| JP | 2014-098352 | 5/2014 |
| TW | I339719 | 4/2011 |
| WO | 99/27304 | 6/1999 |
| WO | 2013/046825 | 4/2013 |
| WO | 2016/027509 | 2/2016 |

OTHER PUBLICATIONS

Written Opinion of the International Searching Authority dated Oct. 11, 2016 in International (PCT) Application No. PCT/JP016/076625, with English translation.

International Search Report dated Oct. 11, 2016 in International (PCT) Application No. PCT/JP2016/076625.

Office Action and Search Report dated Mar. 27, 2019 in Chinese Application No. 201680048885.X.

Notice of Reasons for Refusal dated Aug. 6, 2019 in corresponding Japanese Patent Application No. 2017-539874, with English translation.

* cited by examiner

COMBUSTOR PIPE, COMBUSTOR, AND GAS TURBINE

TECHNICAL FIELD

The present invention relates to a combustor pipe and a combustor used in a gas turbine, and a gas turbine provided with the combustor.

BACKGROUND ART

A gas turbine combustor generates high-temperature combustion gas during operation of the gas turbine, and is heated by the combustion gas because the generated combustion gas passes therethrough. Therefore, the combustor distributes a gas, such as air or steam, as a cooling medium to cool each part, and thus suppresses a rise in temperature. A known gas turbine combustor, among this type of gas turbine combustor, includes a combustor that cools a combustor pipe (transition piece, combustion liner) of the combustor using a cooling medium (for example, JP 2006-105076 A, hereinafter the JP '076 reference). The gas turbine disclosed in the JP '076 reference A sprays cooling air toward a vane shroud supporting a vane from a downstream end part of a transition piece.

The device disclosed in the JP '076 reference sprays cooling air toward a vane shroud from a transition piece to prevent the intrusion of combustion gas between the transition piece and the vane shroud. While the gas turbine disclosed in the JP '076 reference is able to prevent burnout of a gap part between the transition piece and the vane shroud, this results in the cooling air being sprayed in a combustion gas flow path. Therefore, gas turbine efficiency (amount of energy that can be generated by burning a prescribed amount of fuel) decreases.

An object of the present invention is to provide a combustor pipe that is able to efficiently cool a part of the combustor pipe where a temperature rises without spraying cooling air, and further raise reliability without reducing efficiency of the gas turbine, and to provide a combustor and a gas turbine provided with this combustor.

SUMMARY OF THE INVENTION

The present invention is a combustor pipe having an inlet and an outlet, and provided with: an inner pipe of which an inner space is a flow path for passing a combustion gas, a first cooling flow path through which a cooling medium passes being formed inside a wall that forms the flow path; and an outer pipe provided on an outer circumference of the inner pipe and secured to the inner pipe, wherein a second cooling flow path through which a cooling medium passes and which is connected to the first cooling flow path near the outlet of the combustor pipe is formed between an outer circumferential surface of the inner pipe and an inner circumferential surface of the outer pipe, and a cooling promoting structure (cooling promoter) is formed on the outer pipe, inside the second cooling flow path near the first cooling flow path.

Furthermore, it is preferable that the cooling promoting structure have an uneven shape where a distance from the inner pipe changes based on position.

It is also preferable that at least part of protruding parts of the uneven shape of the cooling promoting structure be in contact with the inner pipe.

It is also preferable that the cooling promoting structure be a plurality of through holes through which the cooling medium passes.

It is also preferable that the cooling promoting structure be formed on a side of the outer pipe farther on a rotational axis side of the gas turbine than the inner pipe.

It is also preferable that an end part on the outlet side be linked to a vane shroud in which a vane is provided, and that the cooling promoting structure be formed in at least one location within a range that includes a position overlapping an end part on an upstream side of the vane in a rotational direction of a gas turbine rotor.

It is also preferable that an end part on the outlet side be linked to a vane shroud in which a vane is provided, and that the cooling promoting structure be provided in a range of ⅓ P or greater and 3 P or less, with P being a pitch of the vanes in a rotational direction of a gas turbine rotor.

It is also preferable that an end part on the outlet side be linked to a vane shroud in which a vane is provided; that the inner pipe have a flange part extending toward the outer pipe in an end part on the vane shroud side; and that the combustor pipe be provided with a welded part at which an end part on the vane shroud side of the outer pipe is connected to an end part of the flange part by welding.

It is also preferable that the welded part connect a surface of the flange part on a side opposite the vane shroud side to the outer pipe.

The present invention is a combustor having the combustor pipe according to any of the above.

The present invention is a gas turbine that includes a compressor, the above combustor for burning fuel and air that is compressed by the compressor to generate combustion gas, and a turbine driven by the combustion gas supplied from the combustor.

The present invention is able to efficiently cool a part of a combustor pipe where a temperature rises, and thus further raise reliability of the combustor pipe without reducing efficiency of a gas turbine.

DETAILED DESCRIPTION OF THE PREFERRED EMBODIMENTS

Preferred embodiments of the present invention will be described with reference to the drawings.

Figure 1:
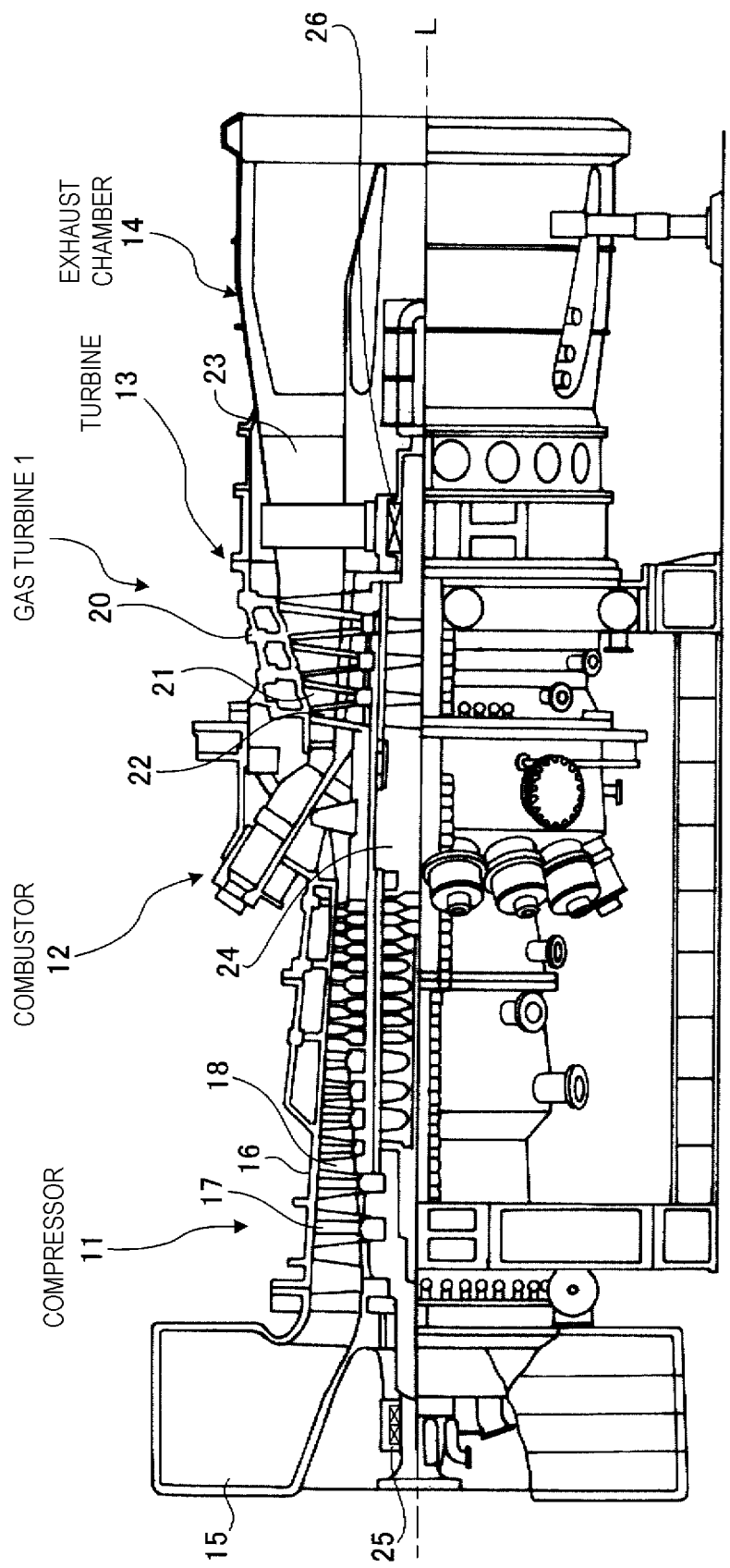
FIG. 1 is a schematic configuration drawing of a gas turbine having a combustor according to the present embodiment.

FIG. 1 is a schematic configuration view of a gas turbine having a combustor according to the present embodiment. As illustrated in FIG. 1, a gas turbine 1 has, in order from an upstream side in a direction in which a fluid flows, a compressor 11, a gas turbine combustor (hereinafter referred to as a combustor) 12, a turbine 13, and an exhaust chamber 14. For example, a generator is linked to the turbine 13. The gas turbine has a rotor (turbine shaft) 24 that can rotate about a rotational center axis L.

The compressor 11 has a compressor casing 16 connected to an air intake port 15 for taking in air and provided with a flow path in which air flows. The compressor 11 is provided with a plurality of vanes 17 and blades 18 alternately arranged in the air flow path in the compressor casing 16. The combustor 12 supplies fuel to compressed air (combustion air) compressed by the compressor 11, and generates combustion gas by burning an air fuel mixture of the fuel and the combustion air. The turbine 13 has a turbine casing 20 provided with a flow path into which the combustion gas generated in the combustor 12 flows. In the turbine 13, a plurality of vanes 21 and blades 22 are arranged alternately from upstream to downstream in a direction in which the combustion gas flows as a fluid, inside the combustion gas flow path of the turbine casing 20. The vane 21 is supported on a vane shroud 50, which is one part of the turbine casing 20. A space through which the combustion gas flows is formed inside the vane shroud 50. The vane shroud 50 secures the vane 21 in the space through which the combustion gas passes. Furthermore, the combustor 12 is linked to the vane shroud 50.

The exhaust chamber 14 has an exhaust diffuser 23 into which the combustion gas that has passed through the turbine 13 flows. The rotor 24 is positioned so as to penetrate center parts in a radial direction of the compressor 11, combustor 12, turbine 13, and exhaust chamber 14. An end part on the compressor 11 side of the rotor 24 is rotatably supported centered on the rotational center axis L by a bearing part 25, and an end part on the exhaust chamber 14 side thereof is rotatably supported centered on the rotational center axis L by a bearing part 26. A plurality of disc plates are secured to, and each of the blades 18 and 22 is linked to, the rotor 24.

In this type of gas turbine 1, the air taken in from the air intake port 15 of the compressor 11 passes through the plurality of vanes 17 and blades 18 and are thereby compressed to become high-temperature, high-pressure compressed air. A prescribed fuel is supplied to the compressed air in the combustor 12, and thus the compressed air becomes an air fuel mixture with the fuel. The air fuel mixture is burned in the combustor 12, thus becoming combustion gas. A high-temperature, high-pressure combustion gas, which is an operation fluid generated in the combustor 12, passes through the plurality of vanes 21 and blades 22 provided in the turbine 13, and rotates the rotor 24. A generator linked to the rotor 24 is driven by the rotation of the rotor 24 to thus generate power. Exhaust gas that has passed through the rotor 24 is discharged into the atmosphere as exhaust gas.

Figure 2:
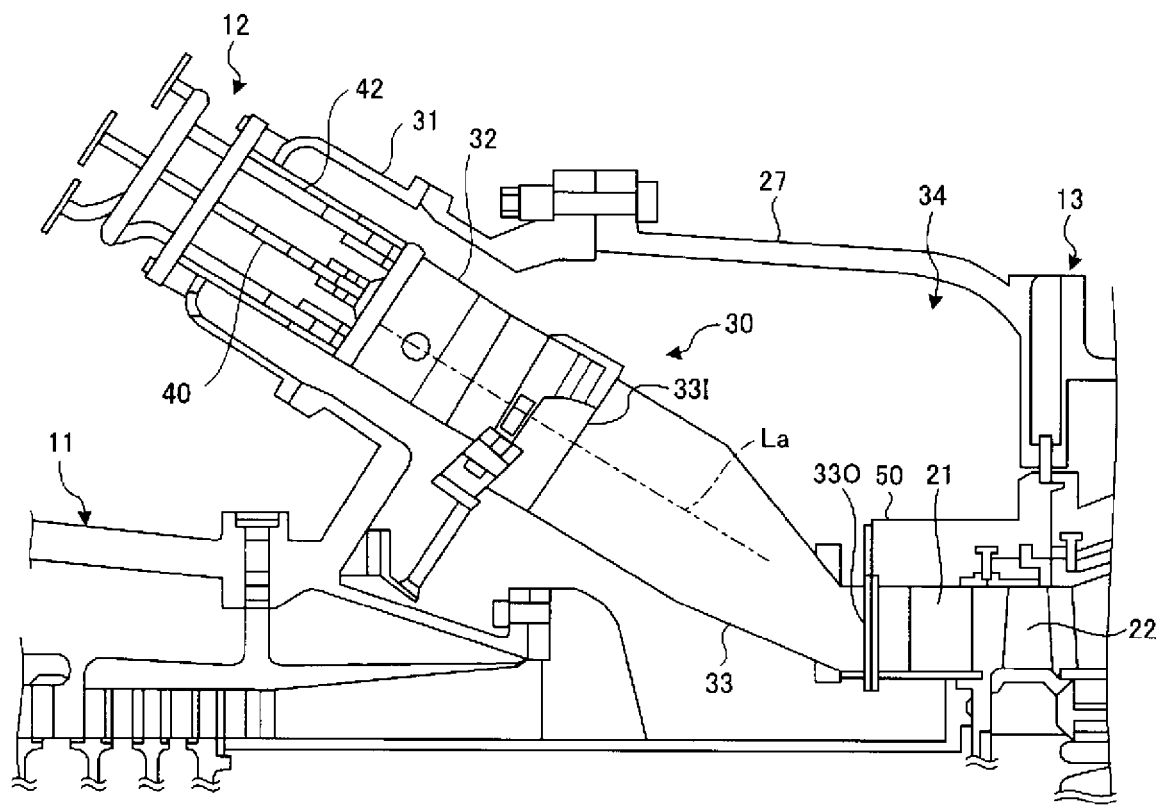
FIG. 2 is an enlarged view of the combustor.

FIG. 2 is an enlarged view of the combustor. The combustor 12 has a combustor casing 30. The combustor casing 30 has a combustor basket 32 provided inside an external cylinder 31, and a transition piece 33 linked to a tip part of the combustor basket 32, and extends along a center axis La that is inclined with respect to the rotational center axis L. Here, in the gas turbine 1, a space between a casing housing 27 and the combustor casing 30 forms a combustor-compressor casing 34. The compressed air compressed in the compressor 11 is extracted into the combustor-compressor casing 34. The compressed air extracted into the combustor-compressor casing 34 flows into the combustor basket 32 of the combustor 12.

The external cylinder 31 is fastened to the casing housing 27. A proximal end part of the combustor basket 32 is supported by the external cylinder 31, and the combustor basket 32 is provided inside the external cylinder 31 with a prescribed gap left between itself and the external cylinder 31. A pilot nozzle 40 is provided along the center axis La in a center part of the combustor basket 32. A plurality of main nozzles 42 are provided evenly spaced and parallel to the pilot nozzle 40 on the circumference of the pilot nozzle 40 so as to surround the pilot nozzle 40.

A proximal end of the transition piece 33 is formed into a cylindrical shape and linked to a tip of the combustor basket 32. The transition piece 33 is formed such that a cross-sectional area becomes smaller and the piece curves toward a tip side, and is open toward a first stage of the vanes 21 of the turbine 13. A distal end of the transition piece 33 is linked to the vane shroud 50. In the transition piece 33, an end part (proximal end) on the combustor basket 32 side forms an inlet 33I, and an end part (distal end) connected to the vane shroud 50 forms an outlet 33O. The transition piece 33 has a combustion chamber therein. In the combustor 12, the external cylinder 31, combustor basket 32, and transition piece 33 form a combustor pipe. Furthermore, in the combustor 12, the transition piece 33 forms a combustor pipe linked to the vane shroud 50.

Figure 3:
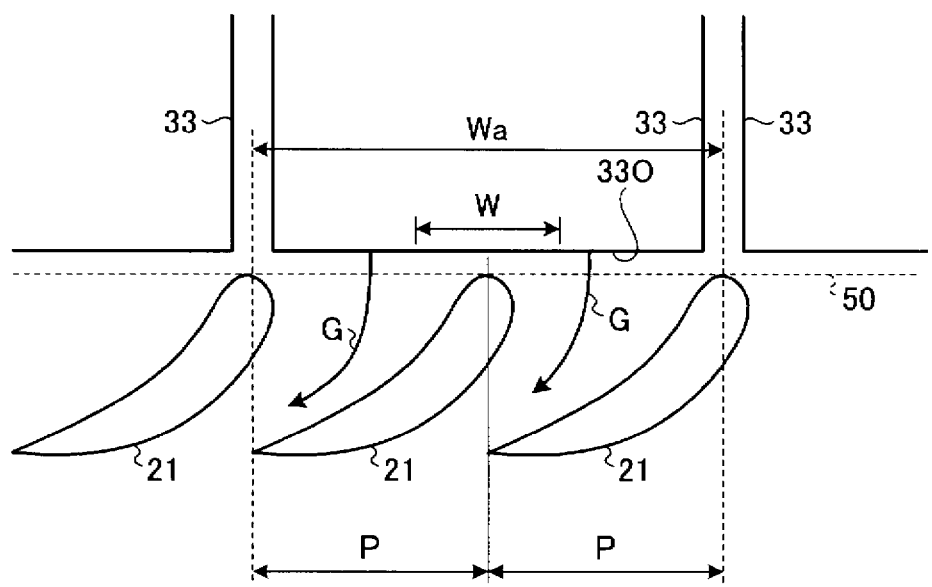
FIG. 3 is a schematic view illustrating a relationship between a transition piece of the combustor and first-stage vanes.
Figure 4:
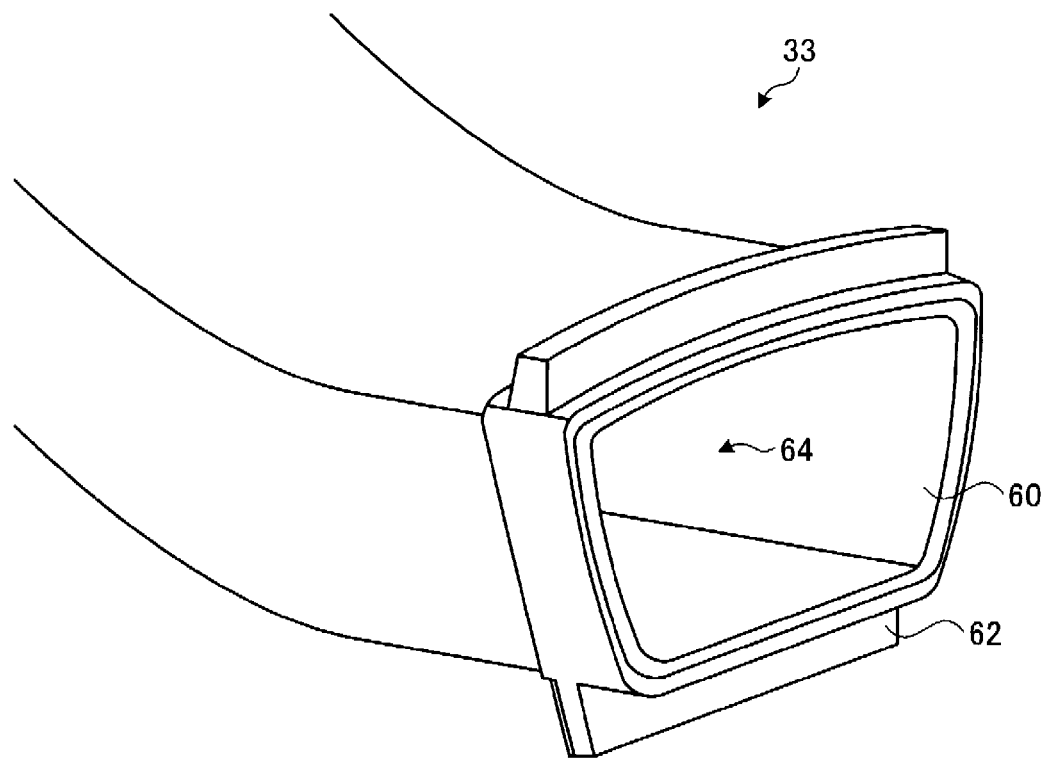
FIG. 4 is a perspective view illustrating a part of the transition piece of the combustor.
Figure 5:
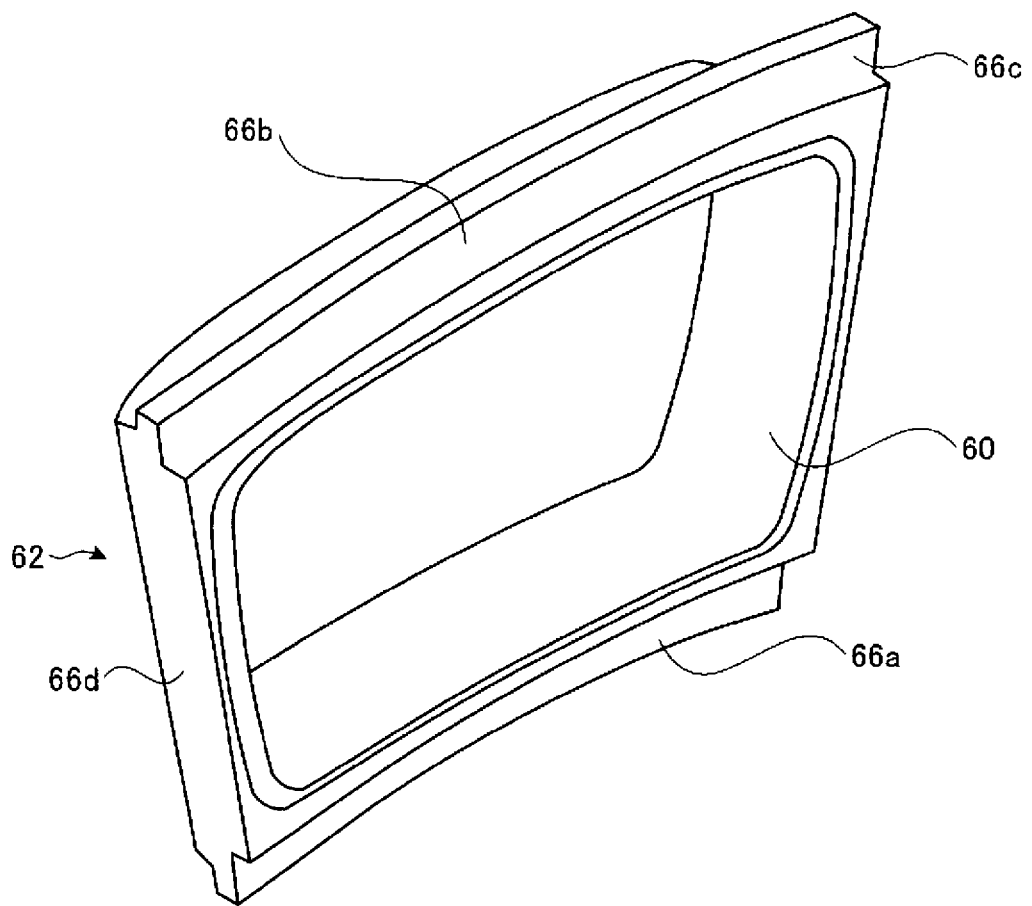
FIG. 5 is a perspective view illustrating a structure of an outlet of the transition piece of the combustor.
Figure 6:
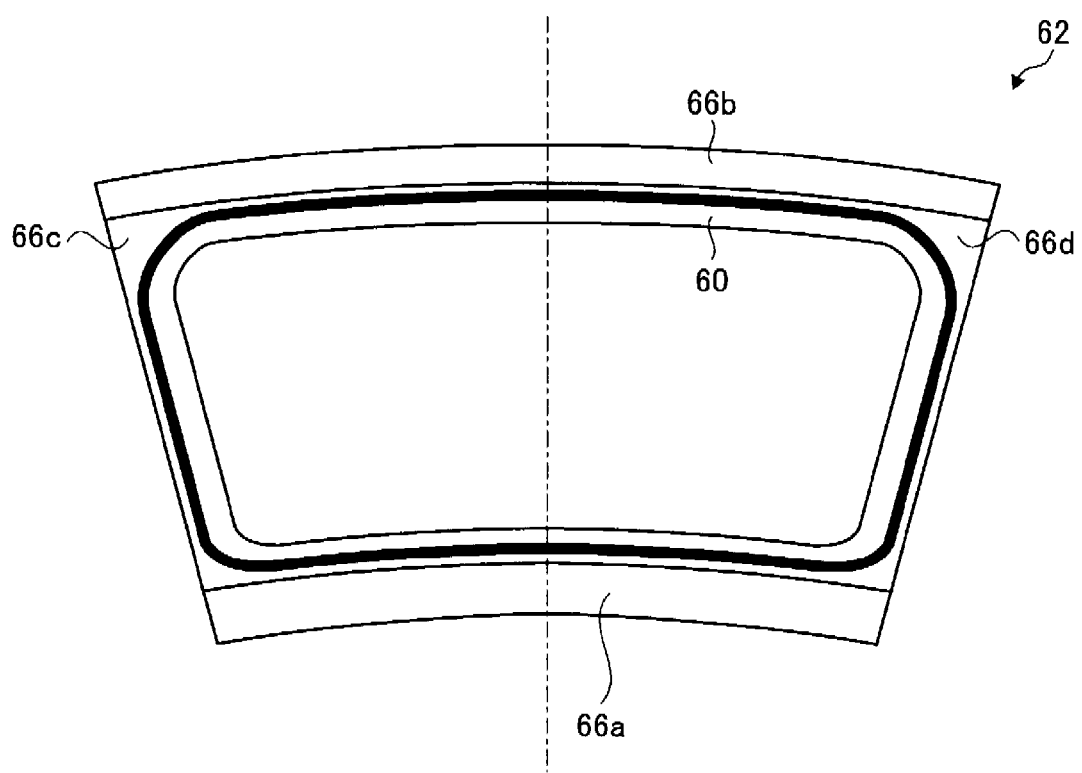
FIG. 6 is a drawing for describing the transition piece of the combustor as seen from an outlet side.
Figure 7:
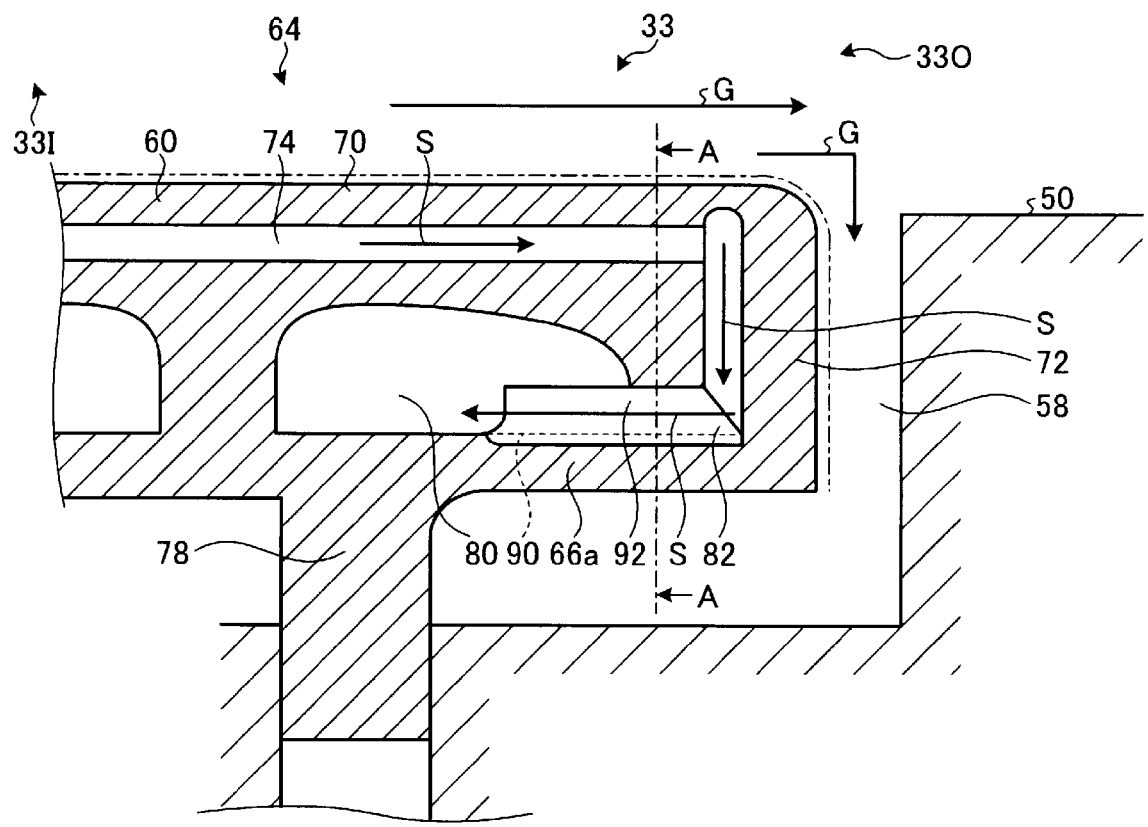
FIG. 7 is a cross-sectional view of the transition piece of the combustor and a vane shroud.
Figure 8:
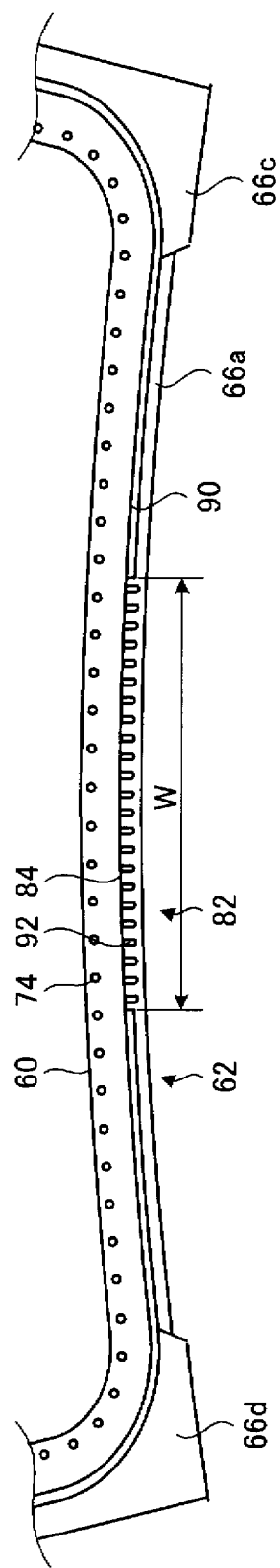
FIG. 8 is a cross-sectional view along A-A in FIG. 7.
Figure 9:
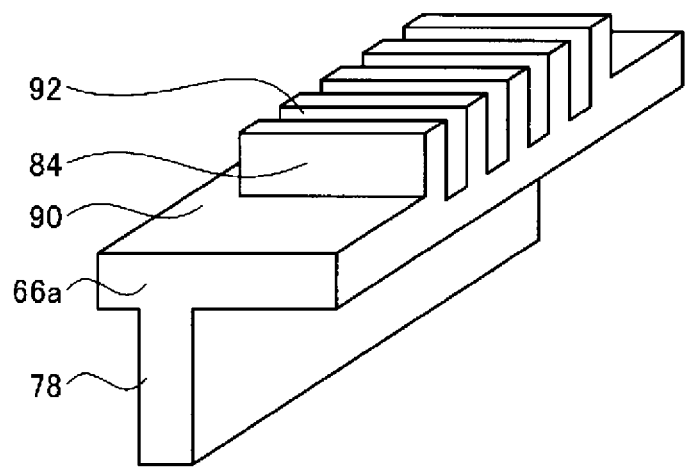
FIG. 9 is a perspective view illustrating a schematic configuration of a cooling promoting structure.

The transition piece 33 is described below using FIG. 3 through FIG. 9, in addition to FIG. 2. FIG. 3 is a schematic view illustrating a relationship between the transition piece of the combustor and first-stage vanes. FIG. 4 is a perspective view illustrating a part of the transition piece of the combustor. FIG. 5 is a perspective view illustrating a structure of an outlet of the transition piece of the combustor. FIG. 6 is a drawing for describing the transition piece of the combustor as seen from an outlet side. FIG. 7 is a cross-sectional view of the transition piece of the combustor and the vane shroud. FIG. 8 is a cross-sectional view along A-A in FIG. 7. FIG. 9 is a perspective view illustrating a schematic configuration of a cooling promoting structure (cooling promoter) 82.

The transition piece 33 is a cylindrical member, and as described above, one end of a cylindrical inner space thereof forms the inlet 33I for a combustion gas G and the other end forms the outlet 33O for the combustion gas G. In the transition piece 33, the end part on the outlet 33O side is linked to the vane shroud 50. Furthermore, the vane (first-stage vane) 21 is provided on a downstream side of the outlet 33O of the transition piece 33 in the direction in which the combustion gas G flows. In the transition piece 33, the combustion gas G that has flowed in from the inlet 33I flows out from the outlet 33O, and is led to the turbine 13 illustrated in FIG. 1. The combustion gas G that has flowed out from the outlet 33O of the transition piece 33 passes between the vanes 21. Here, in the present embodiment, the distance at which the vanes 21 are provided in the rotational direction is referred to as a pitch P. A range W will be described later. Furthermore, an arrangement pitch of the transition pieces 33 is referred to as a distance Wa. In the present embodiment, two of the vanes 21 are provided with respect to each transition piece 33, and the positions of the vanes 21 are the same with respect to each transition piece 33. In other words, in the gas turbine according to the present embodiment, the distance Wa between the transition pieces 33 is equal to the pitch P of two of the vanes 21, thus establishing the relationship Wa=2 P.

As illustrated in FIG. 4 and FIG. 5, the transition piece 33 has an inner pipe 60 and an outer pipe 62. The inner pipe 60 and the outer pipe 62 are linked by welding. The inner pipe 60 has a cylindrical shape and is thus a cylindrical member of which a space inside the cylinder forms a combustion gas flow path 64 through which combustion gas passes. The inner pipe 60 has a shape where a cross section of the pipe has a deformed trapezoidal shape, and sides of the inner pipe 60 extending along the rotational direction (rotational direction of the rotor 24) form arcs. The inner pipe 60 is shaped such that the width in the rotational direction becomes narrower toward the rotational center axis L.

The outer pipe 62 is provided on an outer circumference of the inner pipe 60, and covers part of the outer circumference of the inner pipe 60. As illustrated in FIG. 5 and FIG. 6, the outer pipe 62 has four segments 66a, 66b, 66c, and 66d. The segment 66a faces a surface on the rotational axis center side of the inner pipe 60. In other words, the segment 66a is provided farther toward the rotational axis center than the inner pipe 60. The segment 66b faces an outside surface in a rotational axis direction of the inner pipe 60. In other words, the segment 66b is provided at a position separated farther from a rotational axis than the inner pipe 60. The segments 66c and 66d respectively face two surfaces that form end surfaces in the rotational direction of the inner pipe 60. One end part of the segment 66a in the rotational direction is secured to the segment 66c by, for example, welding. One end part of the segment 66b in the rotational direction is also secured to the segment 66c by, for example, welding. Furthermore, the segments 66a, 66b, 66c, and 66d are secured to the inner pipe 60 by, for example, welding. In this way, the outer pipe 62 covers the entire outer circumference of the inner pipe 60 using the segments 66a, 66b, 66c, and 66d. The outer pipe 62 forms a single cylindrical shape out of the segments 66a, 66b, 66c, and 66d.

As illustrated in FIG. 7, the inner pipe 60 has an inner wall part 70 and a flange part (end part) 72 provided on an end surface on the vane shroud 50 side. The inner wall part 70 is the part that configures the cylinder of the inner pipe, and an area surrounded by the inner wall part 70 forms the combustion gas flow path 64. The flange part 72 faces the vane shroud 50. A space between the flange part 72 and the vane shroud 50 is a gap 58. Furthermore, the flange part 72 is secured to the outer pipe 62 by, for example, welding.

A plurality of first cooling flow paths 74 are formed inside the inner wall part 70 (i.e., inside the wall surrounding the combustion gas flow path 64). The plurality of first cooling flow paths 74 are formed in a wall extending direction, and are aligned in a direction orthogonal to the direction in which the combustion gas flows. The first cooling flow path 74 is formed by connecting a flow path extending in the direction in which the combustion gas G flows, in order words, extending from the inlet 33I toward the outlet 33O, and a flow path extending in a direction separating from the combustion gas flow path 64 along the flange part 72 at an end on the outlet 33O side. Note that the first cooling flow path 74 may have a shape in which the flow path extending in the direction separating from the combustion gas flow path 64 along the flange part 72 at the end on the outlet 33O side is connected to the same parts of the other first cooling flow paths 74. In other words, the flow path extending in the direction separating from the combustion gas flow path 64 along the flange part 72 at the end on the outlet 33O side of the first cooling flow path 74 may be a flow path that is common to the plurality of first cooling flow paths 74.

Next, as described above, the outer pipe 62 is a cylinder that surrounds an outer circumferential surface of the inner pipe 60 (i.e., a surface on an opposite side from an inner circumferential surface forming the combustion gas flow path 64). The outer pipe 62 is secured to the inner pipe 60 by, for example, welding. In the outer pipe 62, a securing part 78 is formed on a surface on an opposite side from the inner pipe 60. The securing part 78 is linked to the vane shroud 50.

In the transition piece 33, a second cooling flow path 80 is formed between the inner pipe 60 and the outer pipe 62. The second cooling flow path 80 is a space between surfaces of the inner pipe 60 and the outer pipe 62 facing each other (i.e., a space between a surface on the outer circumferential side of the inner pipe 60 and a surface on the inner circumferential side of the outer pipe 62). The second cooling flow path 80 is connected to (communicates with) the first cooling flow path 74.

As illustrated in FIG. 7 through FIG. 9, in the outer pipe 62, a cooling promoting structure 82 is formed in the second cooling flow path 80 (i.e., in a surface facing the inner pipe 60). The cooling promoting structure 82 is provided near a part of the second cooling flow path 80 that connects (communicates) with the first cooling flow path 74. Specifically, the cooling promoting structure 82 is provided near the flange part 72. The cooling promoting structure 82 according to the present embodiment is provided only on the segment 66a of the four segments 66a, 66b, 66c, and 66d that is located on an inner side in the rotational axis direction. Furthermore, the cooling promoting structure 82 according to the present embodiment is provided on part, specifically in the range W, of the second cooling flow path 80 of the segment 66a in the rotational direction. The range W is a range that includes the center in the rotational direction of the outer pipe 62.

As illustrated in FIG. 8, in a cross section in which the cooling promoting structure 82 is provided, the transition piece 33 includes a space 90 which is a part where the cooling promoting structure 82 is not provided, and a space 92 which is a part where the cooling promoting structure 82 is provided. In the space 90, end surfaces of the inner pipe 60 and the outer pipe 62 are substantially parallel, and a width between the inner pipe 60 and the outer pipe 62 is substantially constant even in a case where a position in the rotational direction moves. By contrast, as illustrated in FIG. 7 through FIG. 9, the cooling promoting structure 82 is an uneven shape formed in a surface of the outer pipe 62. Specifically, a plurality of protruding parts 84 are provided at prescribed intervals in the rotational direction. In the protruding part 84, a tip of a protrusion is in contact with the inner pipe 60. Accordingly, the space 92 is provided between two of the protruding parts 84. In other words, in the transition piece 33, the space 92 is divided into a plurality of parts in the rotational direction. Furthermore, in the transition piece 33, a surface of the outer pipe 62 in the part where the space 92 of the cooling promoting structure 82 is formed is separated farther from the inner pipe 60 than in the space 90. In other words, in the outer pipe 62, the part where the cooling promoting structure 82 is formed is separated farther from the inner pipe 60 than the part where the cooling promoting structure 82 is not formed.

In the transition piece 33, a cooling medium S supplied from a mechanism for supplying the cooling medium flows in the flow path of the first cooling flow path 74 extending from the inlet 33I toward the outlet 33O in the same direction as the combustion gas G. The cooling medium S which has flowed through the flow path of the first cooling flow path 74 extending from the inlet 33I toward the outlet 33O flows through the flow path extending in the direction separating from the combustion gas flow path 64 along the flange part 72, and then this cooling medium flows through the second cooling flow path 80. When the cooling medium S which has flowed through the flow path extending in the direction separating from the combustion gas flow path 64 along the flange part 72 flows into the second cooling flow path 80, this cooling medium flows through the cooling promoting structure 82, and then proceeds to a downstream side in a flow direction.

By providing the cooling promoting structure 82 in the transition piece 33, a surface area of the part of the outer pipe 62 that makes contact with the cooling medium S in the part where the cooling promoting structure 82 is provided can be made larger than when the surface of the outer pipe 62 is made flat. Therefore, cooling performance in the transition piece 33 near the flange part 72 where the gap 58 into which the combustion gas G flows is generated can be increased, which thus makes it possible to suppress a temperature increase at the end part of the flange part 72. Furthermore, the cooling medium S flowing through the first cooling flow path 74 and the second cooling flow path 80 formed in the transition piece 33 flows inside the wall of the transition piece 33 and does not flow into a combustion gas flow path. Therefore, cooling performance can be increased without the cooling medium S flowing into the combustion gas flow path 64. Therefore, the cooling medium S mixed with the combustion gas G can be reduced and the temperature of the combustion gas G upstream can be kept from dropping, which makes is possible to extract more energy from the gas turbine, which, in turn, makes it possible to suppress a decrease in the efficiency of the gas turbine. Furthermore, by providing the cooling promoting structure 82 in the transition piece 33 in a part where cooling is required, it is possible to raise cooling performance in said part while maintaining a flow rate of all of the cooling medium supplied to the transition piece 33. Raising cooling performance while suppressing an increase in the flow rate of the cooling medium in this way allows the energy used to generate the cooling medium to be reduced, which thus makes it possible to suppress a decrease in the efficiency of the gas turbine.

Here, it is preferable that the cooling promoting structure 82 be provided in the transition piece 33 in a range including a position overlapping an end part on the upstream side of the vane 21 in the rotational direction, as in the present embodiment. Therefore, it is possible to suppress a temperature increase in the position overlapping the end part on the upstream side of the vane 21, which is an area where the combustion gas G does not easily flow through the combustion gas flow path 64 due to the presence of the vane 21 compared with other parts in the rotational direction, and where the combustion gas G flows into the gap 58 and temperature tends to rise.

In the transition piece 33, it is preferable that the cooling promoting structure 82 be provided so that the end part on the upstream side of the vane 21 is located in a range of 0.5 W or less from a center of the range W. In this way, a rise in temperature can be suppressed efficiently.

It is preferable that the range W in which the cooling promoting structure 82 is provided be ⅓ or greater and 3 times or less of the overall length of the side of the outer pipe 62 where the cooling promoting structure 82 is provided. In this way, a rise in temperature can be suppressed efficiently. It is also preferable that the range W be ⅓ P or greater and 3 P or less with respect to the pitch P of the vanes 21. In this way, a rise in temperature can be suppressed efficiently.

In the transition piece 33, it is preferable that a height of the space 92 between two of the protruding parts 84 of the cooling promoting structure 82 be no more than 2.5 times a width thereof. In other words, in the cooling promoting structure 82, it is preferable that the protruding part 84 be formed so that the space 92 satisfies [Height≤5×Width]. This allows cooling performance to be increased while suppressing an increase in a pressure loss caused by the provision of the cooling promoting structure 82.

Furthermore, by making the protruding part 84 of the cooling promoting structure 82 a structure that makes contact with the inner pipe 60 in the transition piece 33, the outer pipe 62 can be positioned more accurately with respect to the inner pipe 60. Therefore, while it is preferable that the cooling promoting structure 82 be made a structure where the protruding part 84 makes contact with the inner pipe 60, there may be a gap between the protruding part 84 and the inner pipe 60.

While it is preferable to provide the cooling promoting structure 82 in the range described above in the transition piece 33, said structure may be provided across an entire area of a side of the second cooling flow path 80 on the inner side in the rotational direction. Furthermore, the cooling promoting structure 82 may be provided in the transition piece 33 over the entire circumference of the second cooling flow path 80, in other words, in the segments 66b, 66c, and 66d, in addition to the segment 66a.

Figure 10:
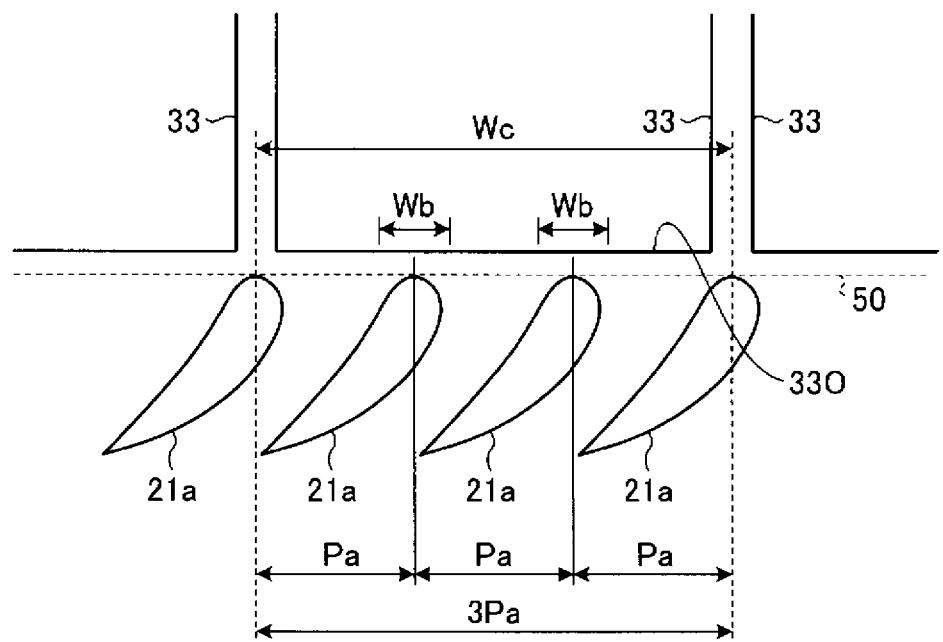
FIG. 10 is a schematic view illustrating another example of the relationship between the transition piece of the combustor and the first-stage vanes.

FIG. 10 is a schematic view illustrating another example of the relationship between the transition piece of the combustor and the first-stage vanes. The gas turbine according to the embodiment described above has a structure in which two of the vanes 21 are provided with respect to each transition piece 33 in the rotational direction so that the distance Wa=2 P; however, the gas turbine is not limited to this structure. The cooling promoting structure 82 is provided in a range Wb in a gas turbine having the transition piece 33 and vanes 21a illustrated in FIG. 10. Furthermore, in the gas turbine, three of the vanes 21a are provided for each transition piece 33 in the rotational direction. Furthermore, the positions of the vanes 21 are the same with respect to each transition piece 33. In other words, in the gas turbine illustrated in FIG. 10, a distance Wc between the transition pieces 33 is equal to a pitch Pa of three of the vanes 21, thus establishing the relationship Wc=3 Pa. It is also preferable in a case where Wc=3 P in this way that the range Wb be ⅓ Pa or greater and 3 Pa or less just as with the aforementioned range W of the transition piece 33. Furthermore, while the pitches W and Wb of the transition pieces 33 are integral multiples of the pitches P and Pa of the vanes 21 and 21a in the present embodiment, the embodiment is not limited thereto, and thus may be a structure where the pitches W and Wb of the transition pieces 33 are set to values other than the integral multiples of the pitches P and Pa of the vanes 21 and 21a, in other words, where the positions of the vanes 21 and 21a vary based on the position of the transition piece 33 in the circumferential direction.

Here, it is preferable that the welded part between the inner pipe 60 and the outer pipe 62 in the transition piece 33 be provided in a surface facing the vane shroud 50. It is preferable that the welded part be provided in a position that is visible when viewed from the vane shroud 50 side. This allows welding work to be performed easily. Furthermore, while the outer pipe 62 and the inner pipe 60 are secured by welding in the embodiment described above, the outer pipe 62 and the inner pipe 60 may be manufactured by casting the two as a single body.

Figure 11:
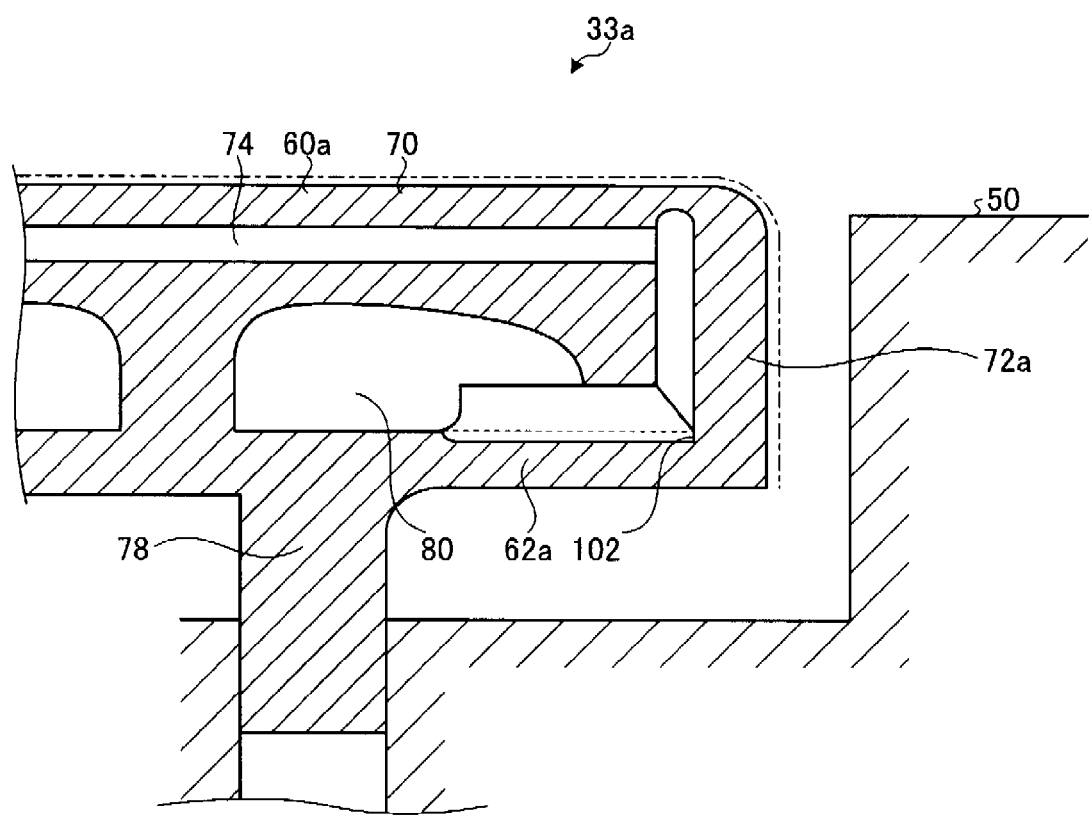
FIG. 11 is a cross-sectional view illustrating another example of the transition piece.

FIG. 11 is a cross-sectional view illustrating another example of the transition piece. A transition piece 33a illustrated in FIG. 11 has the same basic structure as the transition piece 33. A description is given below that focuses on characteristic points of the transition piece 33a. In the transition piece 33a illustrated in FIG. 11, the welded part is provided between a surface 102 of a flange part 72a on an opposite side from a surface facing the vane shroud 50 and an outer pipe 62a. Specifically, the flange part 72a is a plate of which a thickness is constant up to an end part, and a groove is machined into the outer pipe 62a and a welded part is provided between the surface 102 and the outer pipe 62a by welding the two.

Providing the welded part in the surface 102 on the opposite side of the surface facing the vane shroud 50 in the transition piece 33a in this way, makes it possible to produce a structure in which the welded part is not exposed in the surface facing the vane shroud 50. Therefore, the surface of the transition piece 33a facing the vane shroud 50 can be limited to the flange part 72a, which allows durability with respect to heat to be increased and a temperature rise with respect to an amount of heating to be reduced. The welded part can also be made less prone to being heated by the combustion gas G flowing into the gap 58.

Furthermore, cooling performance can be increased in the transition piece 33 while an increase in pressure loss is kept small by giving the cooling promoting structure an uneven shape that extends in a direction that follows the flow of the cooling medium. Therefore, while it is preferable that the cooling promoting structure be given an uneven shape that extends in the direction that follows the flow of the cooling medium, the shape of the structure is not limited thereto. It is sufficient that the cooling promoting structure increases cooling performance compared with in a case where a surface of the outer pipe facing the inner pipe is a flat surface.

Figure 12:
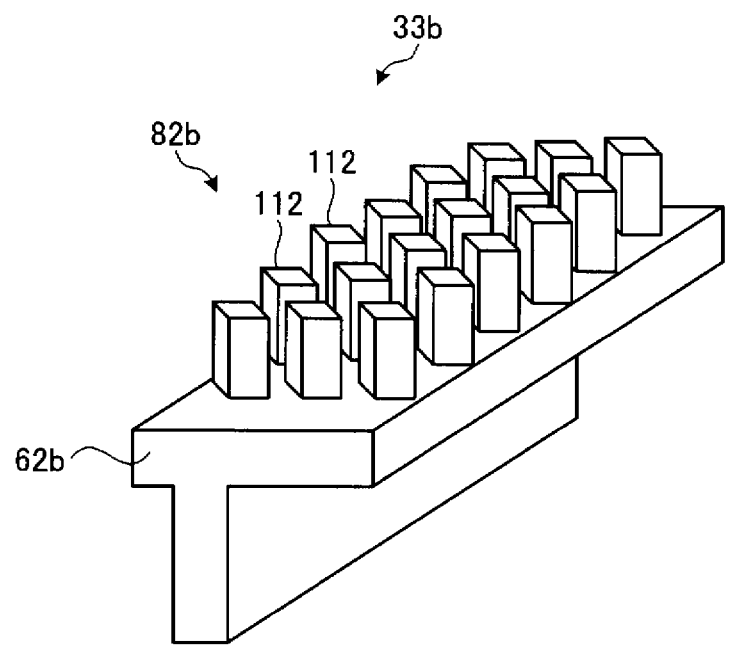
FIG. 12 is a perspective view illustrating a schematic configuration of another example of the cooling promoting structure.

FIG. 12 is a perspective view illustrating a schematic configuration of another example of the cooling promoting structure. A transition piece 33b illustrated in FIG. 12 has the same basic structure as the transition piece 33. A description is given below that focuses on characteristic points of the transition piece 33b. Protruding parts 112 protruding toward the inner pipe 60 are two-dimensionally arrayed on a surface of an outer pipe 62b in a cooling promoting structure 82b of the transition piece 33b. In other words, the protruding parts 112 are provided in rows in the rotational direction, and are also provided in rows in a direction orthogonal to the rotational direction in the cooling promoting structure 82b. In this way, cooling performance can be raised by the cooling promoting structure 82b even when it is a structure in which the protruding parts 112 are two-dimensionally arrayed.

Figure 13:
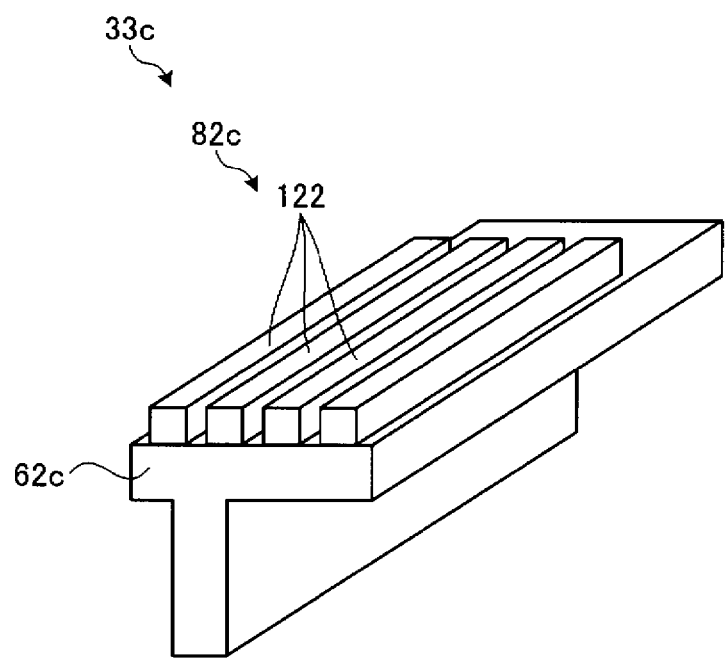
FIG. 13 is a perspective view illustrating a schematic configuration of another example of the cooling promoting structure.

FIG. 13 is a perspective view illustrating a schematic configuration of another example of the cooling promoting structure. A transition piece 33c illustrated in FIG. 13 has the same basic structure as the transition piece 33. A description is given below that focuses on characteristic points of the transition piece 33c. A plurality of protruding parts 122 protruding toward the inner pipe 60 are provided on a surface of an outer pipe 62c in a cooling promoting structure 82c of the transition piece 33c, along a direction following a direction in which the cooling medium S flows. In other words, the protruding parts 122 are provided in the cooling promoting structure 82c in rows in a direction that is orthogonal to the rotational direction. In this way, cooling performance can be raised by the cooling promoting structure 82c even when the protruding parts 122 are provided in rows in the direction orthogonal to the rotational direction.

Figure 14:
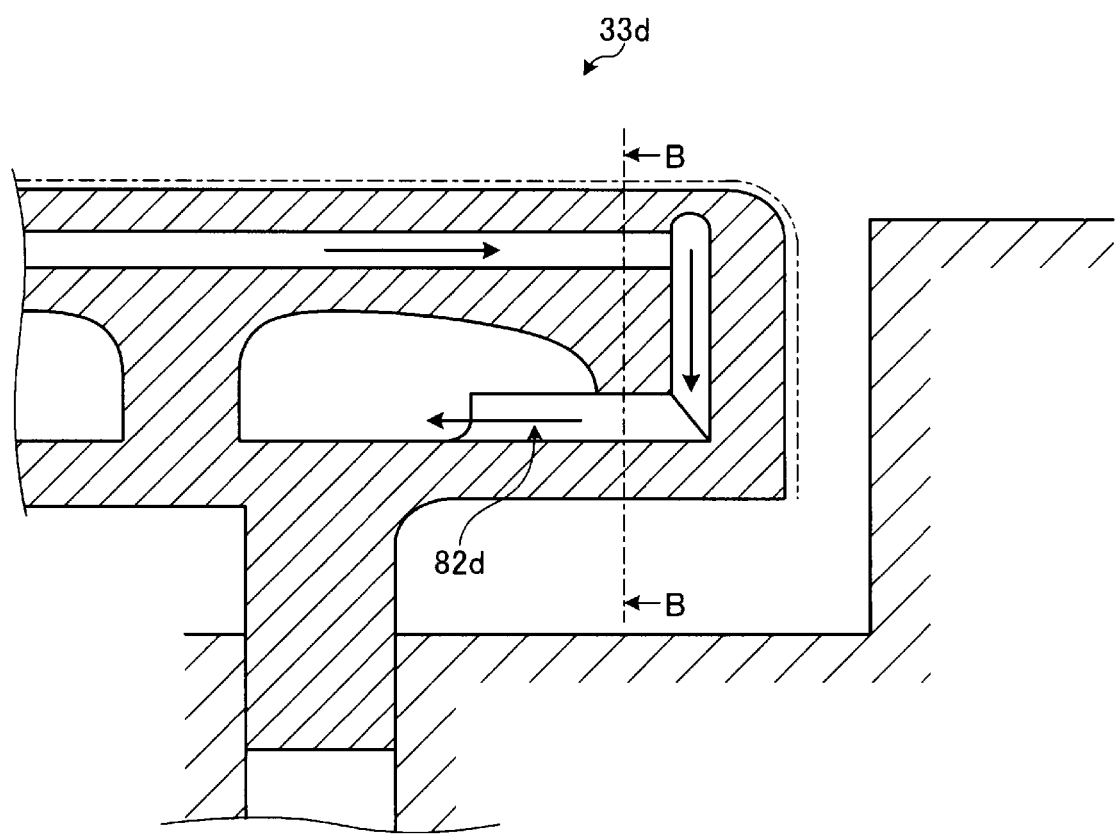
FIG. 14 is a cross-sectional view illustrating another example of the transition piece.
Figure 15:
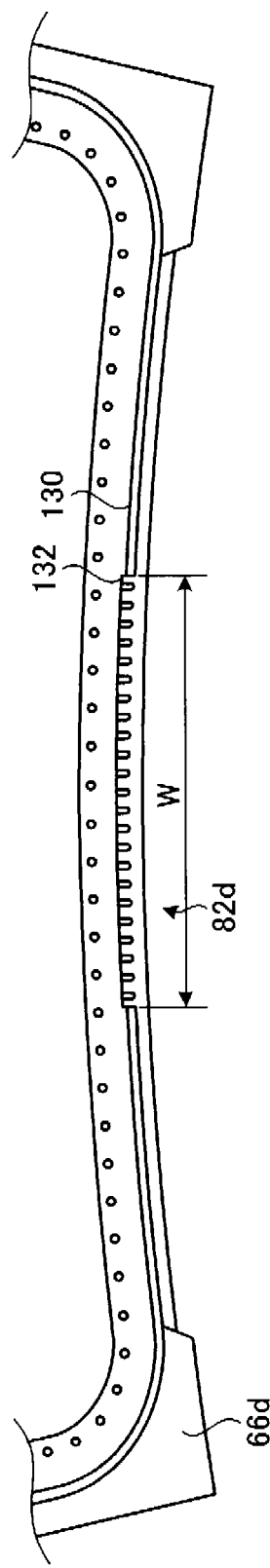
FIG. 15 is a cross-sectional view along B-B in FIG. 14.

FIG. 14 is a cross-sectional view illustrating another example of the transition piece. FIG. 15 is a cross-sectional view along B-B in FIG. 14. A transition piece 33d illustrated in FIG. 14 and FIG. 15 has the same basic structure as the transition piece 33. A description is given below that focuses on characteristic points of the transition piece 33d. In a cooling promoting structure 82d of the transition piece 33d, a height of a surface of a part of an outer pipe 62d in which the cooling promoting structure 82d is not provided, and a height of a surface of a recessed part of the outer pipe 62d in which the cooling promoting structure 82d is provided, are the same height in a cross section in which the cooling promoting structure 82d is provided in the transition piece 33d. Furthermore, a height of a part of a surface 130 of an inner pipe 60d in which the cooling promoting structure 82d is not provided, and a height of a surface 132 of an area of the inner pipe 60d in which the cooling promoting structure 82d is provided, are different heights in a cross section in which the cooling promoting structure 82d is provided in the transition piece 33d. In other words, the surface 132 is formed in a position that is closer to the exhaust gas flow path 64 than the surface 130, in other words, formed in a shape that is recessed with respect to the second cooling flow path 80.

In this way, the height of the surface of the inner pipe may be changed in the transition piece 33d in the cross section in which the cooling promoting structure 82d is provided. Furthermore, by making a distance between the outer pipe and the inner pipe, except for the protruding parts, in a region in which the cooling promoting structure 82d is provided, larger than a distance between the outer pipe and the inner pipe in a region in which the cooling promoting structure 82d is not provided, a decrease in overall flow path cross-sectional area caused by the provision of the cooling promoting structure 82d can be avoided. Therefore, cooling performance of a target part can be increased and a required position can be cooled efficiently while a change in a pressure loss in the second cooling flow path 80 is suppressed.

Figure 16:
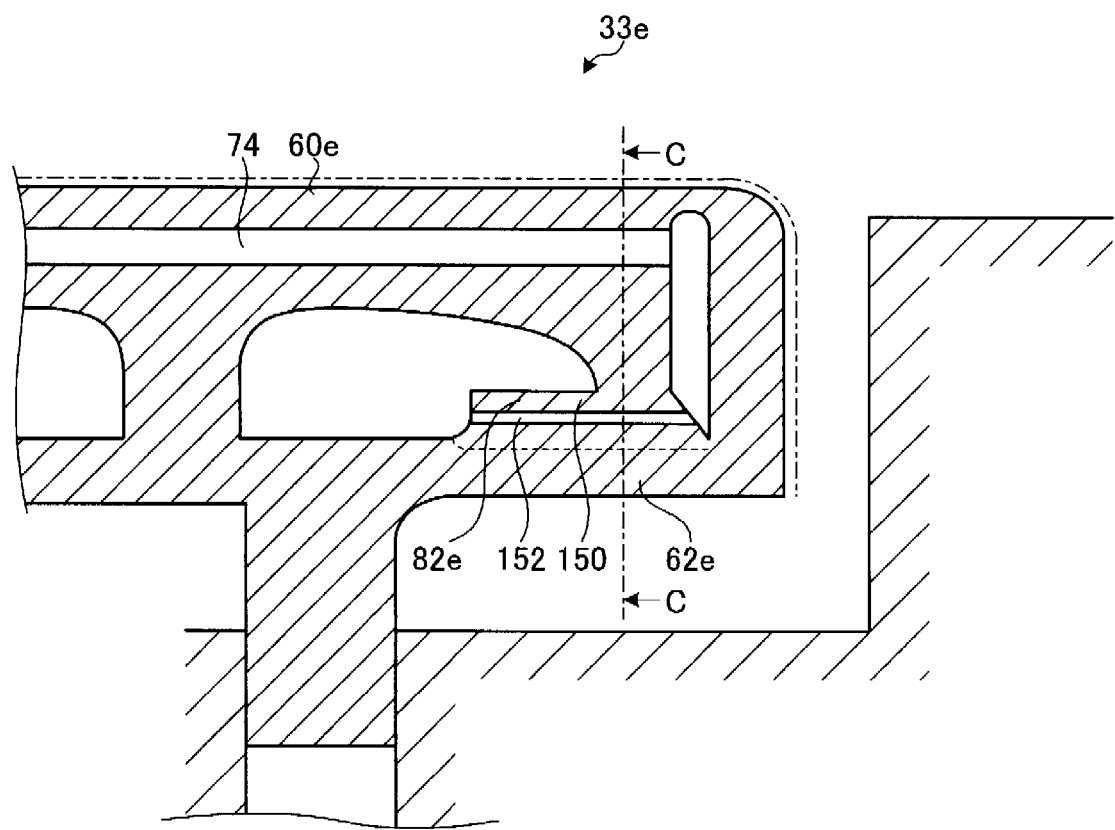
FIG. 16 is a cross-sectional view illustrating another example of the transition piece.
Figure 17:
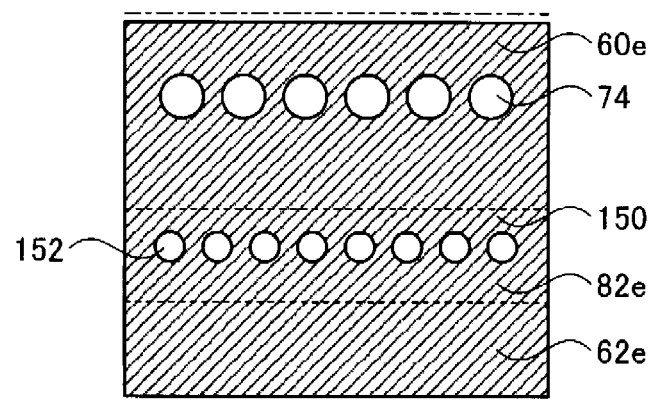
FIG. 17 is a cross-sectional view along C-C in FIG. 16.
Figure 18:
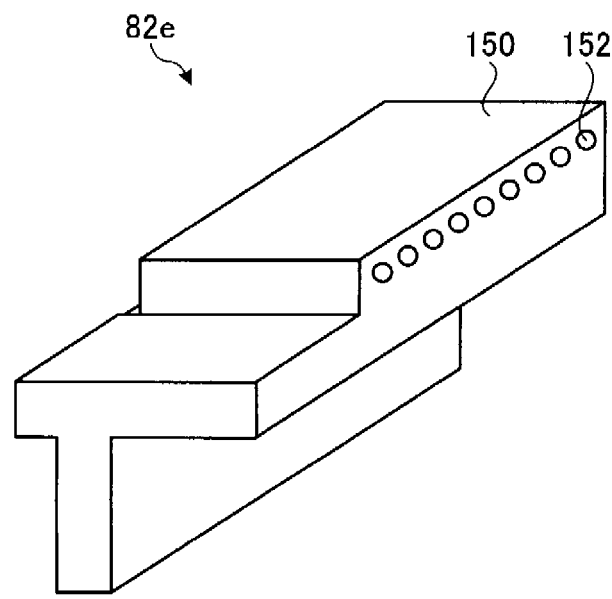
FIG. 18 is a perspective view illustrating a schematic configuration of the cooling promoting structure illustrated in FIG. 16.

Furthermore, while all of the cooling promoting structures are structures provided with a plurality of protruding parts in the embodiment describe above, the structures are not limited thereto. FIG. 16 is a cross-sectional view illustrating another example of the transition piece. FIG. 17 is a cross-sectional view along C-C in FIG. 16. FIG. 18 is a perspective view illustrating a schematic configuration of the cooling promoting structure illustrated in FIG. 16. A transition piece 33e illustrated in FIG. 16 through FIG. 18 has the same basic structure as the transition piece 33. A description is given below that focuses on characteristic points of the transition piece 33e. The transition piece 33e has a cooling promoting structure 82e that has a protruding part 150. The protruding part 150 is provided on an outer pipe 62e and makes contact with an inner pipe 60e. The protruding part 150 extends in the rotational direction. A plurality of through holes 152 are formed in the protruding part 150. The through hole 152 penetrates the protruding part 150 and connects the first cooling flow path 74 to another part of the second cooling flow path 80. The through hole 152 serves as a flow path through which the cooling medium S flows.

In this way, a plurality of the through holes 152 that connect the first cooling flow path 74 to another part of the second cooling flow path 80 and through which the cooling medium S flows are formed in the cooling promoting structure 82e. Because the cooling medium S flows through the through hole 152 formed in the protruding part 150 in the transition piece 33e, a contact area between the cooling medium S and the outer pipe 62e can be made larger, which thus makes it possible to improve cooling performance. While the cooling promoting structure 82e according to the present embodiment is a structure having one protruding part 150, the structure may have two or three or more such parts.

While the present embodiment and modified examples thereof have been described above, the present embodiment and the modified examples thereof are not intended to be limited by the content described above. Furthermore, elements easily conceived by a person skilled in the art, and elements that are effectively the same as, and elements that are of a so-called equivalent scope as the constituent elements of the present embodiment and the modified examples thereof described above are included therein. Furthermore, the constituent elements described above can be appropriately combined. Finally, the constituent elements can be omitted, replaced, and changed to the degree that doing so does not deviate from the gist of the present embodiments and the modified examples thereof.

REFERENCE NUMERALS

1 Gas turbine
11 Compressor
12 Combustor
13 Turbine
14 Exhaust chamber
15 Air intake port
16 Compressor casing
17, 21 Vanes
18, 22 Blades
20 Turbine casing
23 Exhaust diffuser
24 Rotor
25, 26 Bearing parts
27 Casing housing
30 Combustor casing
31 External cylinder
32 Combustor basket
33 Transition piece
40 Pilot nozzle
42 Main nozzle
50 Vane shroud (shroud)
58 Gap
60 Inner pipe
62 Outer pipe
64 Combustion gas flow path
66a, 66b, 66c, 66d Segments
70 Inner wall part
72 Flange part (end part)
74 First cooling flow path
78 Securing part
80 Second cooling flow path
82 Cooling promoting structure
84 Protruding part

The invention claimed is:

1. A combustor pipe comprising:
an inner pipe having an inner space forming a combustion gas flow path for guiding a combustion gas, the inner pipe including a wall with a first cooling flow path through which a cooling medium passes formed therein, the wall forming the combustion gas flow path having an inlet and an outlet;
an outer pipe on an outer circumference of the inner pipe and secured to the inner pipe;
a flange on an end of the inner pipe at the outlet of the combustion gas flow path, the flange extending radially outward with respect to a combustion gas flow direction;
a second cooling flow path through which the cooling medium passes, the second cooling flow path communicating with the first cooling flow path at the outlet of the combustion gas flow path and being formed between an outer circumferential surface of the inner pipe and an inner circumferential surface of the outer pipe, and
a cooling promoter in the outer pipe at the flange on the end of the inner pipe to which the outer pipe is secured, the cooling promoter being inside the second cooling flow path near the first cooling flow path.

2. The combustor pipe according to claim 1, wherein the cooling promoter has an uneven shape such that a distance from the inner pipe changes based on position.

3. The combustor pipe according to claim 2, wherein at least part of protruding parts of the uneven shape of the cooling promoter is in contact with the inner pipe.

4. The combustor pipe according to claim 1, wherein the cooling promoter is a plurality of through holes through which the cooling medium passes.

5. The combustor pipe according to claim 1, wherein the cooling promoter is formed at a side of the outer pipe located farther on a rotational axis side of the gas turbine than the inner pipe.

6. The combustor pipe according to claim 5, wherein:
the end at the outlet of the combustion gas flow path is linked to a vane shroud in which a vane is located, and
the cooling promoter is formed in at least one location within a positional range that includes a position overlapping an upstream end of the vane with respect to a rotational direction of a gas turbine rotor.

7. The combustor pipe according to claim 5, wherein:
the end at the outlet of the combustion gas flow path is linked to a vane shroud in which a vane is located, and
the cooling promoter is located in a positional range of ⅓P or greater and 3P or less, with P being a pitch of the vanes in a rotational direction of a gas turbine rotor.

8. The combustor pipe according to claim 1, wherein:
the end at the outlet of the combustion gas flow path is linked to a vane shroud in which a vane is located, and
the combustor pipe further comprising a welded part at which an end of the vane shroud side of the outer pipe is welded to an end of the flange.

9. The combustor pipe according to claim 8, wherein the welded part connects a surface of the flange on a side opposite the vane shroud to the outer pipe.

10. A combustor comprising the combustor pipe according to claim 1.

11. A gas turbine comprising:
a compressor;
the combustor according to claim 10 for burning fuel and air compressed by the compressor to generate combustion gas; and
a turbine driven by the combustion gas supplied from the combustor.

* * * * *